US007662463B2

(12) United States Patent
Sabbagh

(10) Patent No.: US 7,662,463 B2
(45) Date of Patent: Feb. 16, 2010

(54) AGRICULTURAL BARRIER FILMS HAVING SUPERIOR TEAR STRENGTH PROPERTIES

(75) Inventor: Amiel Bassam Sabbagh, Williamsburg, VA (US)

(73) Assignee: Pliant Corporation, Chippewa Falls, WI (US)

( * ) Notice: Subject to any disclaimer, the term of this patent is extended or adjusted under 35 U.S.C. 154(b) by 0 days.

(21) Appl. No.: 11/840,706

(22) Filed: Aug. 17, 2007

(65) Prior Publication Data

US 2008/0044629 A1  Feb. 21, 2008

Related U.S. Application Data

(60) Provisional application No. 60/822,817, filed on Aug. 18, 2006.

(51) Int. Cl.
*B32B 27/08* (2006.01)
*B32B 27/00* (2006.01)
*A01G 7/00* (2006.01)

(52) U.S. Cl. .............. 428/172; 428/474.4; 428/475.8; 428/476.1; 47/9

(58) Field of Classification Search ............... 428/156, 428/167, 474.4, 475.8, 476.1, 172; 47/9
See application file for complete search history.

(56) References Cited

U.S. PATENT DOCUMENTS

| | | | |
|---|---|---|---|
| 4,410,482 A | 10/1983 | Subramanian | |
| 4,538,531 A | 9/1985 | Wong | |
| 4,819,374 A * | 4/1989 | Gemgnani | ............... 47/58.1 R |
| 5,846,661 A * | 12/1998 | Basset et al. | ............. 428/474.4 |
| 5,873,194 A | 2/1999 | Caldwell | |
| 6,346,285 B1 | 2/2002 | Ramesh | |
| 2007/0298197 A1* | 12/2007 | Bruyndonckx et al. | ..... 428/34.9 |

FOREIGN PATENT DOCUMENTS

| | | |
|---|---|---|
| JP | 10272715 | 10/1998 |
| WO | WO84/00553 | 2/1984 |
| WO | WO 2006/028462 A1 | 3/2006 |

OTHER PUBLICATIONS

James P. Gilbreath, Myriam Siham, Bielinski M. Santos, Nutsedge (Cyperus SPP.) Control and Methyl Bromide Retention with Different Mulches, Proc. Fla. State Hort. Soc. 118:160-162, 2005.
International Search Report corresponding to International Application No. PCT/US2007/076226, mailed Mar. 3, 2008, 3 pages.

(Continued)

*Primary Examiner*—David R Sample
*Assistant Examiner*—Catherine Simone
(74) *Attorney, Agent, or Firm*—McAndrews, Held & Malloy, Ltd.

(57) ABSTRACT

A mulch barrier film having, for example, a methyl bromide permeability of less than about 15 g/m$^2$-hr and machine direction Elmendorf tear strength of at least about 75 gf. The mulch barrier film is an extruded, cast, and preferably embossed, multilayer film having at least one polyolefin layer and at least one polyamide layer. The combination of the film structure and the casting process achieves a barrier film that has low permeability to volatile soil treatment chemicals, such as methyl bromide, and superior tear strength properties.

20 Claims, 2 Drawing Sheets

OTHER PUBLICATIONS

Written Opinion of the International Searching Authority corresponding to International Application No. PCT/US2007/076226, mailed Mar. 3, 2008, 6 pages.

International Preliminary Report on Patentability corresponding to International Patent Application Serial No. PCT/US2007/076226, mailed Mar. 5, 2009.

* cited by examiner

AGRICULTURAL BARRIER FILMS HAVING SUPERIOR TEAR STRENGTH PROPERTIES

CROSS-REFERENCE TO RELATED APPLICATIONS/INCORPORATION BY REFERENCE

This patent application makes reference to, claims priority to and claims benefit from U.S. Provisional Patent Application Ser. No. 60/822,817, filed on Aug. 18, 2006.

FIELD OF THE INVENTION

The present technology relates to mulch barrier films and in particular, relates to multilayer polyamide-containing mulch barrier films having superior machine direction (MD) tear strength properties and excellent resistance to the permeability of chemical treatment agents, including soil fumigants such as methyl bromide (MeBr) and chloropicrin.

BACKGROUND OF THE INVENTION

Mulch films have been used in agriculture for many years to confine chemical treatment agents, such as soil fumigants, to the areas where they are applied. The materials commonly used in the manufacture of such mulch films are polyethylene materials. The polyethylene mulch films are well suited for such use due to their ability to resist puncturing and tear propagation. However, one drawback of such films is that they allow the escape of volatile gaseous soil fumigation compounds such as, for example, methyl bromide, chloropicrin, methyl iodide, dimethyl disulfide, and telone, among others.

Methyl bromide (MeBr) is an odorless, colorless gas that has been used by the agricultural industry as an agricultural soil and structural fumigant to control a wide variety of weeds and pests. However, MeBr is also classified as a Class 1 ozone-depleting substance, and the agricultural industry has therefore sought to develop barrier mulch films that allow for lower MeBr usage rates per acre by more effectively confining the fumigant during the course of treatment.

For example, PCT application WO84/00553 discloses an olefin polymer barrier film that incorporates one or more fatty acid derivative compounds to reduce the permeability of gaseous chemical treatments, such as MeBr and chloropicrin, through the film. Preferred permeability reducing derivative compounds are monoamides, bisamides, amines and esters of polyhydric alcohols. According to the disclosure, MeBr permeability is reduced by more than 10% by the incorporation of the fatty acid derivatives into the film materials.

U.S. Pat. No. 4,538,531 to Wong discloses a method of confining soil fumigation compounds to areas of treated soil by utilizing an olefin polymer film which similarly incorporates the fatty acid derivative compounds disclosed in WO84/00553.

Japanese Publication No. JP 10272715 discloses a coating composition for forming a methyl bromide barrier film which comprises an organic compound having a primary or secondary amino group in the molecule and an organic metal compound.

In recent years, the mulch barrier film market has been dominated by metallized polyethylene films. One such film is commercially available from Canslit, Inc., Montreal, Canada. With metallized films, a thin metal layer of, for example, aluminum, is deposited on the film in a vacuum chamber. Such films are primarily polyolefin based and consequently have excellent resistance to tearing, but their barrier properties are much lower compared to a mulch film containing a nylon barrier layer. Also, the metal layer can disintegrate or dissolve under a variety of soil and weather conditions. Once this happens, the barrier properties of the metallized film are lost.

Another type of commercially available mulch barrier film is a virtually impermeable film (VIF). Such VIF's typically contain a nylon layer, which is known to have excellent barrier properties. Although commercial VIF's have excellent barrier properties and are not susceptible to barrier loss by weather or soil conditions, they are not as resistant to puncturing and tear propagation as polyethylene mulch films. As a result, nylon multilayer mulch barrier films have only had limited use in the agricultural industry despite nylon's excellent barrier properties.

There is still a need for an agricultural mulch barrier film that can meet the needs of the industry. That is, a mulch barrier film that (1) has excellent barrier properties that are resistant to barrier loss from external conditions, (2) has excellent tear strength, and (3) is economical to produce.

SUMMARY OF THE INVENTION

One aspect of the presently described technology is directed to a multilayer mulch barrier film having a polyamide layer that provides excellent barrier properties, and wherein the film is formulated and processed to provide superior tear strength properties.

Another aspect of the presently described technology is directed to a multilayer cast embossed film having a polyamide layer, wherein the film has excellent barrier properties and superior tear strength making it suitable for use as a mulch barrier film.

The multilayer film of the present technology comprises at least one skin layer comprising a polyolefin-based polymer, and at least one barrier layer comprising a polyamide polymer. In one embodiment, the multilayer film has a core layer formed from a polyamide material, and first and second skin layers disposed one on each side of the core layer and formed from at least one polyolefin-based polymer. The polyolefin-based polymer includes, but is not limited to, polyethylene, polypropylene and polyethylene copolymer, blends thereof and mixtures thereof. Tie layers can also be interposed between the polyolefin-based polymer skin layers and the polyamide core layer to improve adhesion between the polyolefin-based polymer layers and the polyamide polymer layer. In an alternative embodiment, the multilayer film has a first skin layer formed from a polyamide material, a second skin layer formed from at least one polyolefin-based polymer, and a tie layer interposed between the first and second skin layers. The multilayer film is a coextruded film prepared by a cast, and preferably embossed process that imparts unexpectedly superior tear strength properties to the film, making the multilayer film suitable for use as an economical mulch barrier film. The multilayer film also has a low permeability to volatile gaseous compounds, such as methyl bromide, chloropicrin, methyl iodide, dimethyl disulfide and telone, that are used for soil fumigation. In particular, the multilayer film has a permeability to volatile gaseous compounds that is less than about 15 g/m²-hr, alternatively less than about 10 g/m²-hr, alternatively less than about 5 g/m²-hr. Such low permeability to volatile gaseous compounds makes the multilayer film of the present technology an excellent barrier film.

BRIEF DESCRIPTION OF THE DRAWINGS

While the specification concludes with claims particularly pointing out and distinctly claiming the subject matter which is regarded as the present invention, it is believed that the presently described technology will be more fully understood from the following description taken in conjunction with the accompanying drawings in which:

DETAILED DESCRIPTION OF THE PREFERRED EMBODIMENTS

Figure 1:
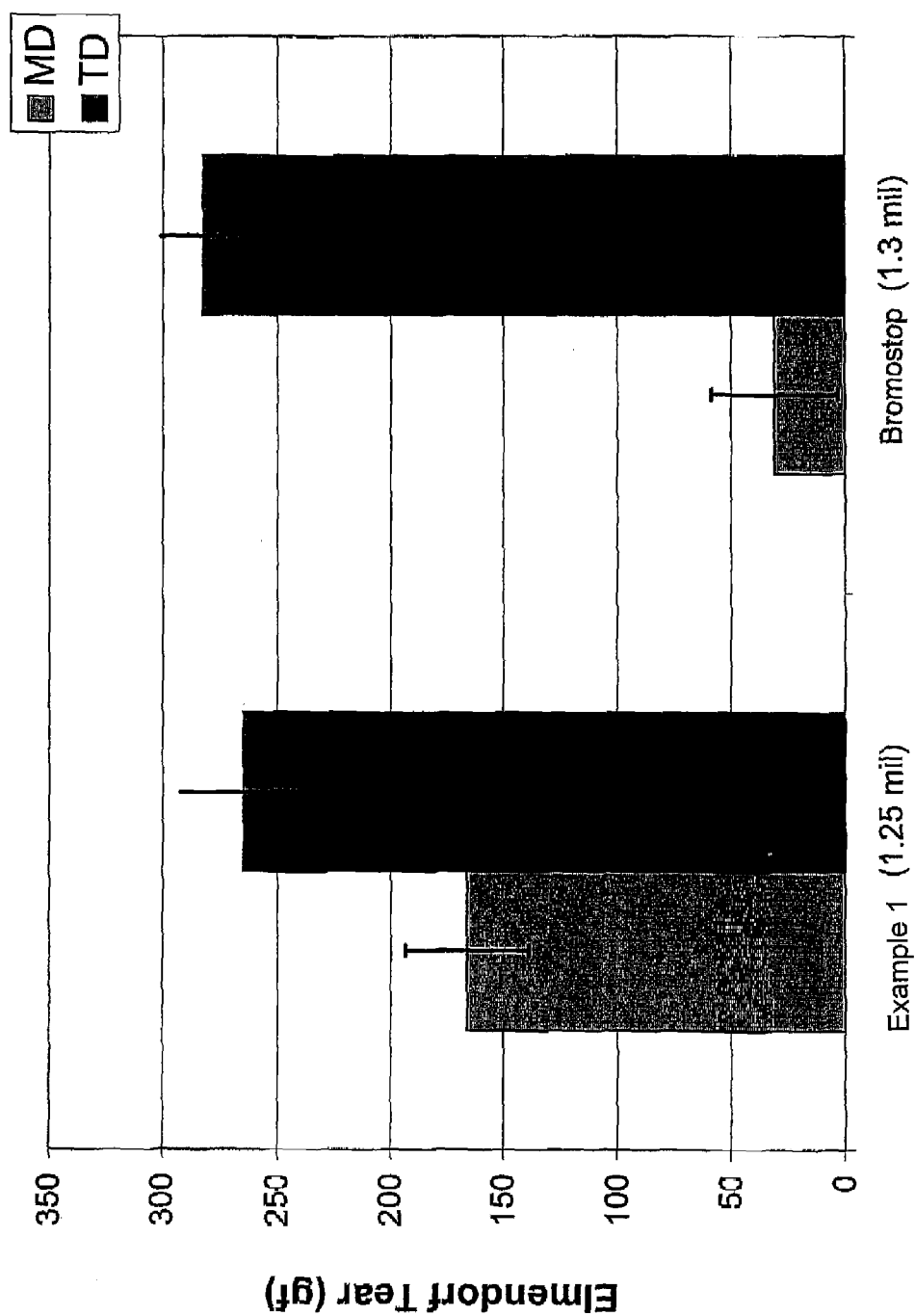
FIG. 1 is a graph comparing the tear strength of films made in accordance with the present technology with the tear strength of a commercially available blown mulch barrier film.

The presently described technology encompasses a combination of film formulation, structure, and processing methods to produce a mulch barrier film having excellent barrier properties and unexpectedly high tear strength properties. The mulch barrier film is a coextruded multilayer film comprising at least one barrier layer comprising a polyamide polymer and at least one skin layer comprising a polyolefin-based polymer. In one embodiment, the mulch barrier film comprises a polyamide core layer interposed between first and second skin layers. Tie layers can also be included in the film structure of this embodiment to provide suitable adhesion between each skin layer and the core layer. Preferably, the gauge of the film ranges from about 0.8 mils to about 4.0 mils.

The first and second skin layers may be the same or different and are formed from at least one polyolefin-based polymer. Examples of suitable polyolefin-based polymers include low density polyethylene, linear low density polyethylene, high density polyethylene, polypropylene, propylene ethylene copolymers, alpha-olefin copolymers, blends thereof, and mixtures thereof. The melt indices (Ml) for the polyolefin-based polymers range from about 0.5 Ml to about 30 Ml, alternatively from about 1 Ml to about 10 Ml. The density for the polyolefins ranges from about 0.86 to about 0.96 g/cc, alternatively from about 0.89 to about 0.94 g/cc. The polyolefin skin layers may make up from about 50% to about 98% of the film structure.

The core layer comprises a polyamide resin which can be a polyamide, such as nylon 6, or a polyamide copolymer. Polyamide copolymers impart higher tear strength than polyamide polymers and are therefore preferable for use as the core layer. Suitable examples of polyamide copolymers for use herein include nylon 6/66, which is a copolymer of nylon 66 and nylon 6 made with hexamethylene diamine, adipic acid and caprolactam, nylon 6/12, which is a copolymer of nylon 6 and nylon 12, nylon 6/69, and mixtures of such polyamide copolymers. The core layer comprises from about 2% to about 25% of the total film structure. More preferably, the core layer comprises from about 5% to about 20% of the total film structure.

Tie layers may be disposed between the core layer and each of the skin layers to improve the adhesion between the core and skin layers. Such tie layers can be formed from compositions known in the art to promote adhesion between incompatible materials. Suitable materials for the tie layers include maleic anhydride grafted polymers, such as those sold by DuPont under the trade name BYNEL® or those sold by Equity under the trade name PLEXAR®. The tie layers may make up between about 1% and about 30% of the total film structure. Alternatively, the polyolefin skin layers may include a percentage of the tie resin to aid in direct bonding of the nylon core to the polyolefin skins. A suitable amount of tie resin incorporated into the skin layer is an adhesion promoting amount that is sufficient to adhere the nylon core to the polyolefin skin layers without allowing the layers to separate.

In an alternative embodiment, the multilayer film comprises a polyamide layer as a first skin layer, at least one polyolefin-based polymer as a second skin layer, and a tie layer interposed between the polyamide skin layer and the polyolefin-based polymer skin layer. In this alternative embodiment the polyamide layer comprises about 2% to about 25% of the total film structure, the tie layer comprises from about 1% to about 30% of the total film structure, and the polyolefin-based polymer skin layer comprises from about 50% to about 97% of the total film structure. Suitable materials for use as the polyamide, polyolefin-based polymer and tie layers are described above.

It will be appreciated by those skilled in the art that one or more additives can be added to one or more of the layers of the multilayer films. Such additives include, but are not limited to, processing aids, lubricants, stabilizers, antiblocking agents, antistatics, color concentrates, slip agents, ultraviolet light inhibitors, antioxidants, derivatives thereof and combinations thereof.

The multilayer films of the present technology have a permeability to volatile gaseous compounds, such as, for example methyl bromide, chloropicrin, methyl iodide, dimethyl disulfide, telone, mixtures thereof, and derivatives thereof, that is less than about 15 $g/m^2$-hr. Preferably, the multilayer films have a permeability that is less than about 10 $g/m^2$-hr, alternatively less than about 5 $g/m^2$-hr, making the multilayer films comparable to or better than the permeability of commercially available VIF's.

Unlike the commercially available VIF's, however, the multilayer films of the present technology are manufactured by a cast extrusion process that results in a mulch barrier film that has unexpectedly high tear strength, especially in the machine direction. Further, the cast films of the present technology have machine direction (MD) and transverse direction (TD) tear strengths that are more closely balanced to each other compared to the MD and TD tear strengths observed with blown films comprising a nylon layer. This is unexpected since cast films typically have more molecular orientation in the MD, resulting in a higher TD tear strength whereas blown films typically have a more balanced molecular orientation between the MD and TD and therefore more closely balanced MD and TD tear strengths. Although not wishing to be bound by any particular theory, it is believed that the presence of the nylon layer in the multilayer films of the present technology has an impact on the MD and TD tear strengths achieved with the cast process.

In the cast extrusion process of the present technology, individual layer materials are introduced into an extruder where they are melted and plasticized. Suitable extruder barrel temperatures range from about 300° to about 500° F., depending upon the amounts and types of materials introduced. The melted and plasticized streams are then fed into a coextrusion die. The coextrusion die may be, for example, a multimanifold die or a feedblock and single manifold die. Suitable temperatures for the coextrusion die range from 350° to about 550° F. While in the die, the layers are juxtaposed and combined, after which they emerge from the die in a single multilayer molten film. As the molten film is extruded from the die tip, it drops down into a nip between two casting rolls. The casting rolls are typically water cooled or heated. Suitable temperatures for the casting rolls are from about 50° F. to about 130° F., alternatively from about 70° F. to about 100° F. As the molten film travels through the nip, it is cooled and forms a multilayer cast film. The combination of the film structure, comprising at least one polyolefin layer and at least one polyamide layer, and the casting process, results in a barrier film having a MD tear strength of at least about 75 grams force.

In a preferred embodiment of the present technology, one of the casting rolls is coated with a smooth silicone rubber coating, while the other casting roll is a steel embossing roll provided with an embossing pattern, such as a male fine square taffeta (MFST) embossing pattern on its surface. As the molten film travels through the nip between the casting roll and the embossing roll, it is cooled and embossed with the MFST embossing pattern. Embossing the cast film enhances the MD tear strength, resulting in a barrier film that has a MD tear strength of at least about 75 grams force, alternatively at least about 100 grams force, alternatively at least about 120 grams force and greater.

One skilled in the art will recognize that modifications may be made in the presently described technology without deviating from the spirit or scope of the invention. It should also be appreciated by those skilled in the art that other applications of the present technology are also envisaged where reduction or prevention of gaseous permeation is desired. The presently described technology is also illustrated by the following examples, which are not to be construed as limiting the invention or scope of the specific procedures or compositions described herein.

EXAMPLE 1

A five layer film was prepared having the following formulation:

| Layer | % | Resin Type | Resin % | MI |
|---|---|---|---|---|
| B (skin) | 40% | LLDPE | 72% | 4 |
| | | LDPE | 10% | 7 |
| | | Additives | 18% | |
| A (tie) | 5% | LLDPE | 87% | 4 |
| | | LDPE | 6% | 7 |
| | | Tie | 7% | 2.7 |
| C (core) | 10% | Nylon 6/12 | 100% | |
| A (tie) | 5% | LLDPE | 87% | 4 |
| | | LDPE | 6% | 7 |
| | | Tie | 7% | 2.7 |
| B (skin) | 40% | LLDPE | 72% | 4 |
| | | LDPE | 10% | 7 |
| | | Additives | 18% | |

In the above table, LLDPE refers to a linear low density polyethylene, LDPE refers to a low density polyethylene, tie refers to a tie resin material and Nylon 6/12 is a polyamide copolymer. The additives include an ultraviolet light inhibitor/anti-oxidant, carbon black or titanium dioxide pigments, slip/anti-blocking agents, and processing aids.

The five layer film was prepared by coextrusion using a cast embossed process. A flowplate having a BACAB layer design was used to combine the melt streams. Extruder B, which was used for the skin layers, had sequential barrel zone temperatures set to 410/450/480/480/480/480° F. Extruder A, used for the tie layers, had barrel temperatures set to 370/390/415/430/430/430° F. Extruder C, used for the core layer, had barrel temperatures set to 430/440/440/440/440/440° F. The sequential die zone temperatures were set to 440/460/480 F. The melt temperatures from the three extruders were 469, 444 and 434° F., for extruders B, A, and C, respectively. The five layer molten film was then cast and embossed by dropping the molten film into a nip between a patterned steel roll having a male fine square taffeta (MFST) pattern and a smooth silicone rubber roll. The embossing roll speed was set at about 331 ft/min. and the casting rolls were cooled to a temperature of about 97° F.

The resulting five layer film was measured for methyl bromide permeability in accordance with ASTM F739-99A. The Example film had a methyl bromide permeability of about 2.2 g/m$^2$-hr.

The Example film was also measured for Elmendorf tear strength in both the machine and transverse directions in accordance with ASTM D-1922. The Example film had an average Elmendorf tear strength of about 166 gf in the machine direction, and about 265 gf in the transverse direction.

The methyl bromide permeability and tear strengths of the Example film were compared to the methyl bromide permeability and tear strengths of a commercially available barrier film sold under the name Bromostop. Bromostop is believed to be a blown film containing nylon. In addition, the methyl bromide permeabilities of other commercially available barrier films were also measured and compared with the Example film. The results of the tear strength comparison are graphically illustrated in FIG. 1, and the results of the methyl bromide permeability comparison are graphically illustrated in FIG. 2.

As can be seen from the FIG. 1 graph, the Example film had a machine direction tear strength of about 166 gf, which is more than five times greater than the machine direction tear strength of about 30 gf measured for the Bromostop blown film. Moreover, the FIG. 1 graph further illustrates that the Example film achieves more closely balanced MD and TD tear strengths compared to the Bromostop film, which has a relatively high TD tear strength of about 280 gf, but a very low MD tear strength of only about 30 gf. These results demonstrate that the cast embossed multilayer barrier film has greatly improved MD tear strength properties compared to a blown nylon-containing barrier film.

Figure 2:
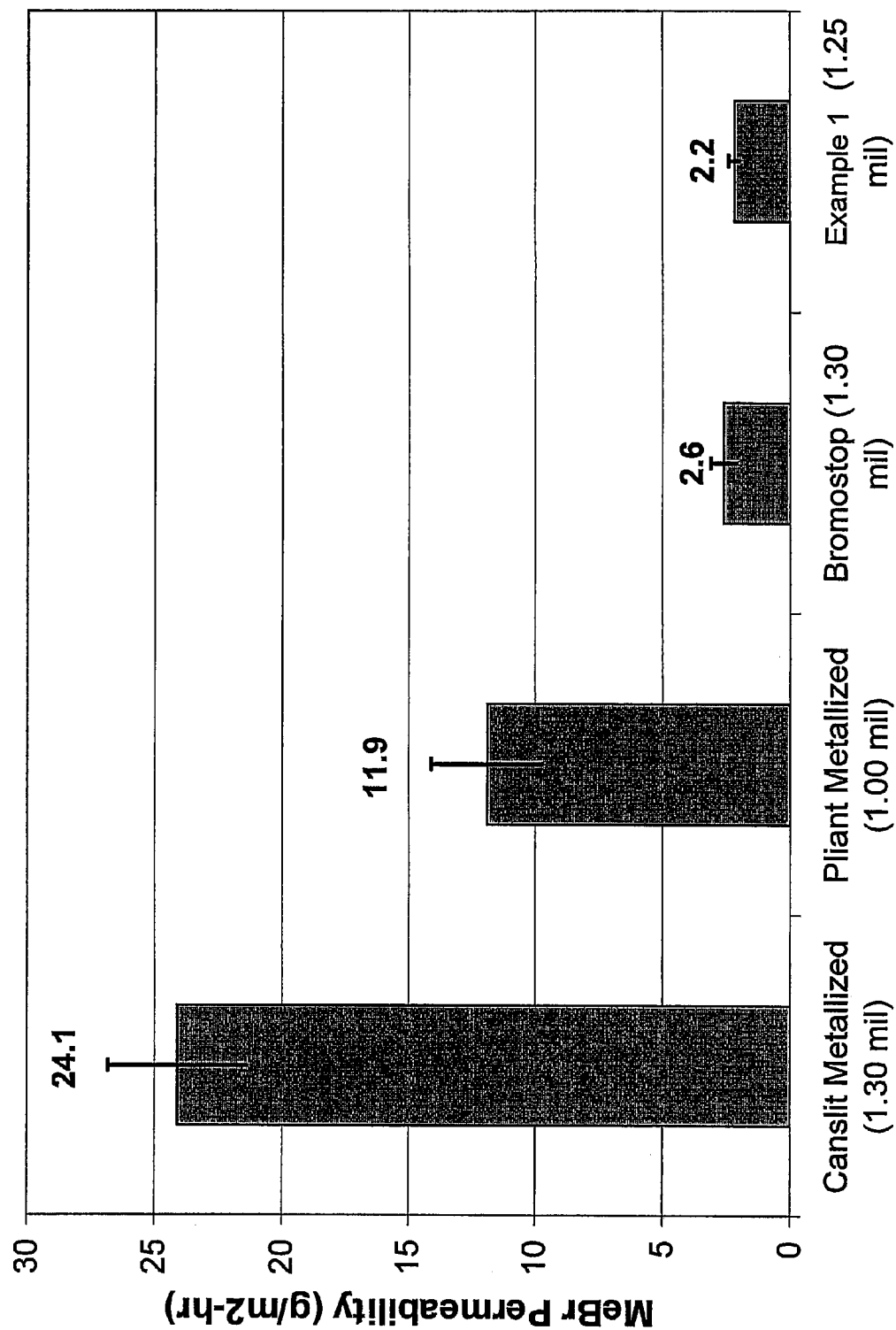
FIG. 2 is a graph comparing the methyl bromide permeability of films made in accordance with the present technology with the permeability of commercially available mulch barrier films.

As can be see from the FIG. 2 graph, the Example film had much lower permeability to methyl bromide compared to two commercially available metallized barrier films, namely a metallized barrier film available from Canslit and a metallized barrier film available from Pliant Corporation. The Example film had a methyl bromide permeability comparable to that of the Bromostop barrier film, which is a VIF (virtually impermeable film). These results demonstrate that the film of the present technology has very low permeability to methyl bromide, making it an excellent barrier film.

EXAMPLE 2

A three layer film is prepared having the following formulation:

| Layer | % | Resin Type | Resin % | MI |
|---|---|---|---|---|
| B (skin) | 85% | LLDPE | 72% | 4 |
| | | LDPE | 10% | 7 |
| | | Additives | 18% | |
| A (tie) | 5% | LLDPE | 87% | 4 |
| | | LDPE | 6% | 7 |
| | | Tie | 7% | 2.7 |
| C (skin) | 10% | Nylon 6/12 | 100% | |

The three layer film is prepared by coextrusion using a cast embossed process similar to the process described in Example 1. The resulting film has excellent tear strength and barrier properties.

EXAMPLE 3

Black, white and clear five layer films made in accordance with Example 1 were measured for permeability of the fumigants telone, chloropicrin, methyl iodide and dimethyl disulfide at 4000 ppm concentrations in air. In addition, two commercially available metallized barrier films available from Canslit and Pliant Corporation were also measured for permeability of the same fumigants. The results are set forth below.

| Film | Thickness | Telone 4000 ppm | Chloropicrin 4000 ppm | Methyl Iodide 4000 ppm | Dimethyl Disulfide 4000 ppm |
|---|---|---|---|---|---|
| Example 3 Black (carbon black pigmented) | 1.25 mil | 0 | 0 | 0 | 0 |
| Example 3 White (titanium dioxide pigmented) | 1.25 mil | 0 | 0 | 0 | 0 |
| Example 3 Clear (no pigment) | 1.25 mil | 0 | 0 | 0 | 0 |
| Metallized - Pliant Corporation | 1.10 mil | 0.11 | 0 | 0 | 0.09 |
| Metallized - Canslit | 1.30 mil | 0.12 | | 0 | |

The permeability of the films was measured in $g/m^2$-hr. From the above table, it can be seen that the multilayer films made in accordance with the present technology had zero permeability to the various fumigants, demonstrating that it is an excellent mulch barrier film.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims.

The invention claimed is:

1. A multilayer barrier film comprising:
   at least one skin layer comprising a polyolefin;
   at least one barrier layer formed from a polymer selected from the group consisting of polyamide, polyamide copolymers, and mixtures thereof;
   wherein the multilayer film is a cast multilayer film having a machine direction Elmendorf tear strength of at least 75 gf and a methyl bromide permeability of less than about 15 $g/m^2$-hr.

2. The multilayer barrier film of claim 1, wherein the barrier layer polymer is a polyamide copolymer or a mixture thereof.

3. The multilayer barrier film of claim 1, wherein the polyolefin layer comprises polyethylene.

4. The multilayer barrier film of claim 1, wherein at least one tie layer is interposed between the at least one skin layer and the barrier layer.

5. The multilayer barrier film of claim 1, wherein the film is embossed.

6. The multilayer film of claim 1, wherein the barrier layer comprises from about 2% to about 25% of the total film structure.

7. The multilayer film of claim 1, wherein the barrier layer comprises from about 5% to about 20% of the total film structure.

8. The multilayer film of claim 1, wherein the barrier layer is a core layer which is interposed between two polyolefin skin layers.

9. The multilayer film of claim 8, wherein a tie layer is interposed between each skin layer and the core layer.

10. The multilayer film of claim 8, wherein an adhesion promoting amount of tie resin is incorporated into each polyolefin skin layer to promote adhesion between the core layer and each skin layer.

11. The multilayer film of claim 1, wherein the film has a machine direction Elmendorf tear strength of at least about 100 gf.

12. The multilayer film of claim 1, wherein the film has a machine direction Elmendorf tear strength of at least about 120 gf.

13. The multilayer film of claim 5, wherein the film is embossed with a male fine square taffeta pattern.

14. The multilayer film of claim 2, wherein the polyamide copolymer is selected from the group consisting of Nylon 6/12, Nylon 6/66, Nylon 6/69 and mixtures thereof.

15. The multilayer barrier film of claim 1, further comprising an optional tie layer interposed between the at least one skin layer and the at least one barrier layer, wherein the barrier layer comprises from about 2% to about 25% of the total film structure, the skin layer comprises from about 50% to about 98% of the total film structure, and the tie layer comprises from about 0% to about 30% of the total film structure.

16. The multilayer barrier film of claim 1, wherein the multilayer film has a methyl bromide permeability of less than about 10 $g/m^2$-hr.

17. The multilayer barrier film of claim 1, wherein the multilayer film has a methyl bromide permeability of less than about 5 $g/m^2$-hr.

18. The multilayer barrier film of claim 1, wherein the multilayer film has a gauge of about 0.8 mils to about 4.0 mils.

19. A multilayer barrier film comprising:
    at least one skin layer comprising a polyolefin;
    at least one barrier layer formed from a polymer selected from the group consisting of polyamides, polyamide copolymers, and mixtures thereof;
    wherein the multilayer film is a cast multilayer film having a machine direction Elmendorf tear strength of at least 75 gf and wherein the multilayer film has a permeability to at least one gaseous fumigation compound of less than about 15 $g/m^2$-hr.

20. The multilayer barrier film of claim 19, wherein the at least one gaseous fumigation compound is selected from the group consisting of methyl bromide, chloropicrin, methyl iodide, dimethyl disulfide, telone, mixtures thereof and derivatives thereof.

* * * * *